United States Patent [19]

Sorensen et al.

[11] Patent Number: 4,969,967

[45] Date of Patent: Nov. 13, 1990

[54] METHOD OF MANUFACTURING PACKING AND STRIP MATERIAL THEREFOR

[75] Inventors: Leif B. Sorensen; Soren H. Sorensen, both of St. Joseph, Mo.

[73] Assignee: Schurpack, Inc., St. Joseph, Mo.

[21] Appl. No.: 299,470

[22] Filed: Jan. 18, 1989

[51] Int. Cl.[5] .................... B32B 31/12

[52] U.S. Cl. .................... 156/66; 24/578; 24/587; 156/244.25; 156/500; 383/63; 428/100

[58] Field of Search .................... 156/66, 244.25, 500; 24/578, 587; 383/63; 428/100

[56] References Cited

U.S. PATENT DOCUMENTS

| | | | |
|---|---|---|---|
| 2,978,769 | 4/1961 | Harrah | 24/201 |
| 3,172,443 | 2/1965 | Ausnit . | |
| 3,473,589 | 10/1969 | Gotz . | |
| 3,608,707 | 9/1971 | Miller . | |
| 3,647,485 | 3/1972 | Seiferth et al. | 99/174 |
| 4,246,288 | 1/1981 | Sanborn, Jr. . | |
| 4,428,788 | 1/1984 | Kamp . | |
| 4,437,293 | 3/1984 | Sanborn, Jr. . | |
| 4,518,087 | 5/1985 | Goglio . | |
| 4,673,601 | 6/1987 | Lamping et al. . | |
| 4,682,366 | 7/1987 | Ausnit et al. . | |
| 4,691,373 | 9/1987 | Ausnit | 383/63 |
| 4,744,674 | 5/1988 | Nocek . | |
| 4,756,629 | 7/1988 | Tilman et al. . | |
| 4,759,642 | 7/1988 | Van Erden et al. . | |
| 4,782,951 | 11/1988 | Griesbach et al. . | |
| 4,786,190 | 11/1988 | Van Erden et al. . | |

FOREIGN PATENT DOCUMENTS

| | | |
|---|---|---|
| 57-105248 | 12/1980 | Japan . |
| 1546433 | 5/1979 | United Kingdom . |

*Primary Examiner*—Robert A. Dawson
*Attorney, Agent, or Firm*—Antonelli, Terry, Stout & Kraus

[57] ABSTRACT

A packing comprising first and second opposed surfaces in a closure area of the packing has profiled portions secured to and extending over each of the opposed surfaces, which profiled portions are adapted to be releasably interengaged to permit connection and disconnection of the opposed surfaces. The profiled portions are each formed integrally with an outer layer of a strip material secured to the associated one of the opposed surfaces. The outer layer of the strip material is formed of a material well suited for forming a peel seal weld with the other opposed surface of the packing, such as a portion of the outer layer of the opposing strip material. The outer layer of each strip material is secured to the one of the first and second opposed surfaces via a base layer of the strip material to which the outer layer is secured by means of a non-peel seal type connection. As a result, the sheet material of the packing, a bag for example, need not be formed of a peel seal weldable material.

19 Claims, 2 Drawing Sheets

METHOD OF MANUFACTURING PACKING AND STRIP MATERIAL THEREFOR

RELATED APPLICATION

This application is commonly owned with copending U.S. Pat. application Ser. No. 267,279, filed Nov. 4, 1988 and now U.S. Pat. No. 4,925,318.

TECHNICAL FIELD

The present invention relates to an improved packing, a method of manufacturing the packing, and a strip material therefor. The packing may be in the form of a bag, cup packing or other form which is adapted to be closed by a tearable weld joint adjacent a mouth opening of the packing and which is also adapted to be closed and reclosed by means of profiled portions extending along opposed surfaces adjacent the mouth area.

BACKGROUND ART

A packing made of a film or sheet which is well suited for a real sealing welding, e.g., along the sides, is difficult to tear-up weld or "peel seal weld", so that the weld is peelable in a reasonably well defined manner. This problem has been overcome in the past by forming the film or sheet in the entire packing of a so-called "peel seal" material. Strips of closing profiled portions made of a conventional packing material, that is a non peel seal material, have been welded to opposed surfaces of such peel seal material packings to enable them to be closed and reclosed. However, these known packings have been problematical in that during opening, peeling can extend beyond the mouth opening into the sides of the packing and/or the strips with the profiled portions can separate from the sheet material of the packing.

The requirement for selecting a peel seal material for the packing material also restricts the freedom of the user in choosing the material for the packing. For example, a non peel seal material may be more desirable from the standpoint of obtaining higher integrity packings, i.e., fewer leakers or defective seals, in packings made with high speed machines. Peel seal materials are also more expensive than conventional materials.

DISCLOSURE OF INVENTION

An object of the present invention is to provide an improved packing, a method of manufacturing the same, and a strip material therefor, which avoid the aforementioned problems with known packings. More particularly, an object of the invention is to provide an improved packing and a method of making the same using a strip material of the invention wherein the sheet material of the packing can be made of a material which is well suited for real sealing welding, e.g., along the sides, while at the same time a portion of the packing in a closure area of the packing can be readily peel seal welded so as to be peelable in a reasonably well defined manner.

A further object of the invention is to provide an improved packing and a method of manufacturing the same wherein during opening of the packing a peeling does not extend beyond the opening into the side of the packing and wherein the strip material of the packing containing a profiled portion does not separate from the packing.

A further object of the invention is to provide an improved packing capable of being peel seal welded at a closure area thereof and also having profiled portions for closing and reclosing an opening of the packing, wherein the maker of the packing is free to use a wide variety of packing materials for making the packing including non peel seal materials, to thereby obtain high integrity production and lower cost packings.

These and other objects of the invention are attained by the method of manufacturing a packing according to the invention which comprises the steps of providing a strip material including a base layer formed of a first material well suited to be secured to a surface of the packing, and an outer layer formed of a second material well suited for forming a peel seal weld with another surface, the outer layer having at least one longitudinally extending profiled portion formed integrally therewith for forming a recloseable joint with at least one complementary profiled portion on an opposing surface, and the base layer and the outer layer being securely connected to one another by means of a non-peel seal type of connection, and securing the strip material to a surface of the packing material by connecting the base layer of the strip material to the packing material. The step of securing the base layer of the strip material to the packing material according to the preferred embodiment of the invention involves welding the base layer to the packing material as by heat sealing under the application of heat and pressure. Since the base layer is well suited for welding to the surface of the packing, the strip material resists being torn out of the closure area of the packing during opening.

A pair of strip materials having complementary profiled portions are provided and secured to respective ones of a pair of opposed surfaces of the packing material in the closure area of the packing. The strip materials are preferably secured to the opposed surfaces in a closure area recessed within the mouth opening of the packing from an outer edge of the opening. By recessing the strip materials, the opposed surfaces of the packing can be sealed to one another at the outer edge of the opening of the packing as by welding. Since the material of the packing, other than the outer layer of the strip material, can be formed of a material well suited for a real sealing welding, e.g., along the sides, the packing is resistant to tearing about the mouth opening thereof.

The strip material of the invention for use in the production of packings, as noted above, comprises a base layer formed of a first material well suited to be secured to a packing film or sheet and an outer layer formed of a second material well suited for forming a peel seal weld with another surface. The outer layer has at least one longitudinally extending profiled portion formed integrally therewith for forming a recloseable joint with at least one complementary profiled portion. The base layer and the outer layer are securely connected to one another by means of a non-peel seal type of connection. According to the disclosed embodiment, the base layer and the outer layer are connected to one another via at least one intermediate layer. In particular, an intermediate binding layer is employed which binds the base layer and the outer layer together with a binding effect which is stronger than the binding effect in a peel seal weld to be formed between the outer layer and another surface. The intermediate binding layer is preferably an adhesive layer. The several layers of the strip material are preferably coextruded to form the composite strip material before the base layer of the strip material is welded, as by heat sealing under the application of heat and pressure, to the surface of a packing material.

In a first disclosed embodiment of the invention, the packing is in the form of a bag. According to a second embodiment, the packing is a cup packing. The base layer of the strip material is preferably formed of a material which is the same or similar to the surface of the packing to which it is to be secured. The outer layer of the strip material also preferably includes at least one planar portion projecting laterally from the at least one profiled portion formed integrally with the outer layer for convenience in peel seal welding the outer layer against an opposed surface of the packing, such as a complementary planar portion on the outer layer of an opposing strip material secured to the packing.

Thus, according to the invention use can be made of a packing film or sheet of a conventional type, preferably polyethylene, to the relevant areas of which sandwich strips are welded, the sandwich strips comprising a thin base layer of the same material as used for the packing film or sheet or a corresponding material, which is well seal-weldable thereto, and an outer layer of a so-called "peel seal" material, which may be integrally shaped with the said closing profile portions, and an intermediate binding layer, preferably an extrudable adhesive, which bonds together the base layer and the outer layer with a bond stronger than the peel seal welding or stronger than the binding between the joined closing profile portions. These sandwich strips may be separately secured to the packing film or sheet, whereby a problem is solved, viz. that the peel seal material is very difficult to join by welding with the packing sheet, and it is now possible to achieve a strong binding to the packing sheet of a material, which is particularly well suited to form a peel seal closure, i.e., a peelable welding constituting a so-called "securing closure" or tamper proof closure.

The improved strip material of the invention also makes it possible to provide a packing which is reclose-able without the packing film or sheet itself having to be shaped with integrated profile portions, i.e., all possible sizes of packings can be produced based on the use of two standard products, viz. conventional thin film or sheet and the improved strip material according to the invention.

These and other objects, features and advantages of the present invention will become apparent from the following description when taken in connection with the accompanying drawings, which show, for purposes of illustration only, several preferred embodiments in accordance with the present invention.

BEST MODE FOR CARRYING OUT THE INVENTION

Figure 1:
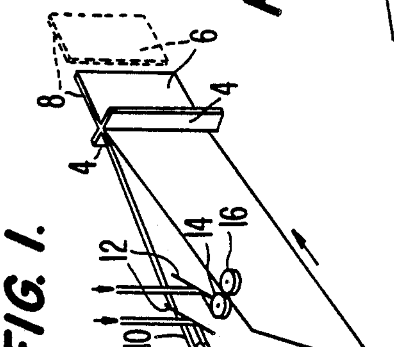
FIG. 1 is a perspective view illustrating the method of the invention.

In FIG. 1 is shown a V-folded sheet length 2 which is moved forwardly towards welding tool claws 4 for providing separate, side edge closed bag members 6 having upper mouth openings 8. At the opposite top edges of the supplied sheet length there is applied to the inside of each of these edge areas respective edge strips 10, which, from supply reels not shown, are advanced downward and about guide rods 12 and applicator rollers 14 cooperating with outer pressure rollers 16. These constitute welding rollers, such that the strip 10 will be successively welded to the respective edge area of the sheet 2.

After this welding on, which may also take place in an entirely non-folded condition of the sheet length 2, the latter is folded together and advanced past the welding claws 4, which convert the sheet web into the single bags 6.

Figure 2:
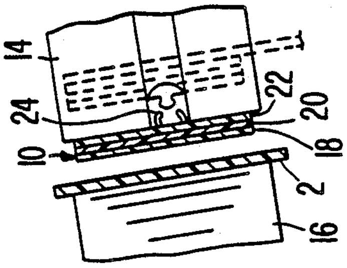
FIG. 2 is a sectional view showing in more detail the design of the sandwich strip.

As shown in FIG. 2, the strip 10 consists of three layers, viz. a base layer 18, which like the sheet 2 may consist of polyethylene, an intermediate layer 20 consisting of an extrudable adhesive, and an outer layer 22, which consists of a so-called peel seal mixture and is shaped with one profiled part 24 of a closing profile system, the complementary part of which is located on the strip 10 secured to the opposite edge of the sheet length.

The strip 10 or rather the two kinds of strips are produced in advance by co-extrusion of the three layers 18, 20 and 22, whereby these layers or the entire strip will show a high internal coherence, despite the outer layer 22 being difficult to join with the base layer 18 by welding. With a suitable peel seal mixture, e.g., with the materials "Surlyn" and "Bynel" (Du Pont, U.S.A.), it is possible to achieve a coherence which is as strong as the weld joints between the polyethylene layers 18 and 2.

By the action of the welding claws 4, the opposed profile strips 10 are pressed together, such that the locking portions 24 will engage with each other at these places, and by a relatively high pressure and high temperature, the strips will be welded strongly together; the claws 4 or a corresponding system with a single claw working against a welding holder-on, operate to melt over the sheet length 2 and the strips 10, and by this melting over, it is possible to establish a welding contact directly between the polyethylene layers at both sides of the strip area, such that the bag edges are effectively welded together also in these areas. Over the distance between the side edges the strip portions may remain out of mutual locking engagement such that the bag may later be filled and then closed by pressing the mouth area together.

Alternately such a pressure closing of bag mouths may be effected in direct association with the very bag production, e.g., by the top edge of the sheet length 2 in FIG. 1 being brought to pass through a pair of pressure rollers before or after the welding station 4. The bag members may even be arranged to be open in the bottom, such that the bags, after being filled through the open bottom, may be closed by means of a simple welding equipment.

Figure 3:
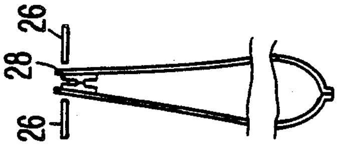
FIG. 3 is a sectional view of a bag member being closed.

In both cases, after or in connection with the joining of the locking portions 24, a peel seal closing of the outer mouth area may be effected, viz. in that, the strip portions 10 are clamped together and heated outside the locking portions 24, as indicated in FIG. 3, which shows a pair of welding tools 26 for this operation. The tools 26 may be rollers or claws. By this operation, a peelable welding is produced between the outer strip layers 22 which directly contact each other, whereby the customers may assure themselves that the bag has not previously been opened, after the factory closing thereof, and as far as the peel seal closure, upon being peeled open, cannot readily be reclosed. To facilitate the opening, outer edge portions 28 of the bag sheet 2 may be left slightly outstanding.

As an example, it is shown in FIG. 3 that the bag may be closed in the bottom by welding, whereby the bag member may be fully top closed already by the production thereof.

According to another variation of the invention, the pair of opposed profile strips for a package can be presealed to one another before they are applied to the packing material. Illustratively, the respective strips 10 to be applied to sheet length 2 for forming bag members 6 can be presealed to one another such that, the locking portions 24 thereof are engaged with each other and strip portions to either or both sides of the locking portions, e.g., outer strip layers 22 are peelable welded to one another as by the application of heat and pressure thereto. This composite strip can then be joined on its opposite outer surfaces by way of the outer base layers 18, to respective edge areas of packing material 2, using opposed welding rollers; for example. Presealing the strip materials to one another before joining the profile strips to the packing material is advantageous in that it permits the package making machine to be simplified and takes some risk away from making the peel seal welds.

Figure 4:
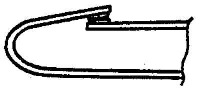
FIG. 4 is a corresponding view depicting another embodiment of the bag.

It is shown in FIG. 4 that a corresponding closing by means of strips 10 may be effected between strips mounted internally and externally, respectively, and generally, it is no major concern of the invention at which place the closing is to be effected. The original welding may well be effected by heat applied from only one side of the laid together strips.

Figure 5:
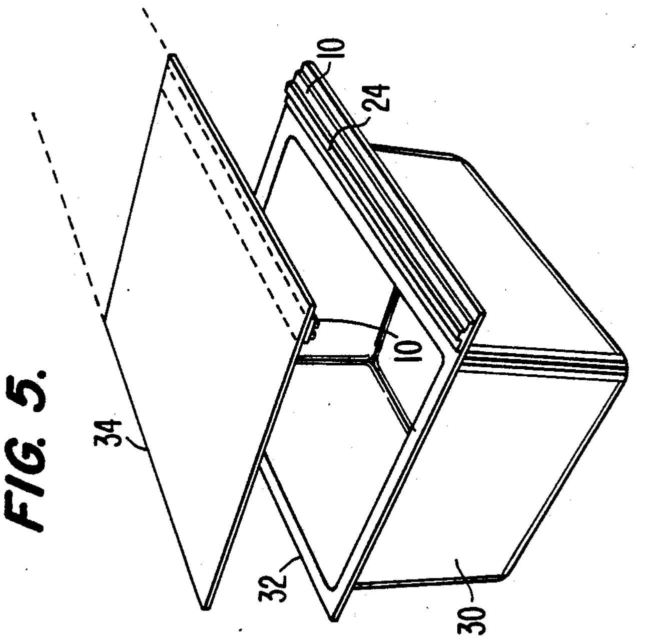
FIGS. 5 and 6 are illustrations of another packing member according to the invention.
Figure 6:
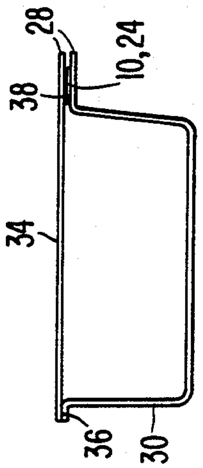

In FIGS. 5 and 6 is shown a cup packing of the well known type consisting of a cup shaped lower part 30, which is made of a relatively thick sheet material, e.g., by vacuum forming, and which has a projecting edge flange 32, and a cover sheet 34, which is welded to the edge flange 32 by welding along its edges. In that connection, it is usual to employ laminated sheet materials having at the inner surfaces an exposed layer of a peel seal material, such that, in general, the welding of the cover sheet onto the edge flange 32 will be a peel seal welding. Hereby it has been required to work with a compromise between a strong and a weak welding as from different points of view, it is desirable both that the cover sheet should be well fastened and that it should be easy to peel off. Often the result is that the cover sheet is too difficult to tear off. Another problem is that the user, who will normally wishes to let the cover sheet remain on the packing after having opened it to a sufficient extent, may find it difficult to control and stop the tearing off of the cover sheet, such that it happens to be torn off entirely.

When in accordance with the invention, a closing strip 10 is secured by welding to the respective sheets along predetermined partial lengths of the closing area, it will be obtained:

that the sheets may be of simple types, i.e., without being produced with any special peel seal layers;

that the closing area outside the said partial length will be joinable by a real welding together, such that the cover sheet will not be peelable along the relevant remaining closing area;

that the peel seal welding between the closing strips may be fairly easy to peel open;

that the closing along the closing strip is nevertheless "good", because it is supported by the lock closure; and that the packing will be recloseable.

In FIG. 6, the real welding joint is shown at 36 and the peel welding at 38; the latter is located inside the lock 24, i.e., nearest the contents of the packing. The combination of the peel-welding and the lock results in a strong closure, which is nevertheless reasonably easy to break, because it is broken in two successive stages; it is perfectly possible to open the lock for inspection of the intactness of the peel sealing, before this sealing is also broken. Alternatively, the peel-welding could be located outside the lock or between two locks. The sequence of opening the packing by the consumer would be different in each case. As noted above, the respective profile strips 10 could be presealed to one another before joining them to the packing.

Figure 7:
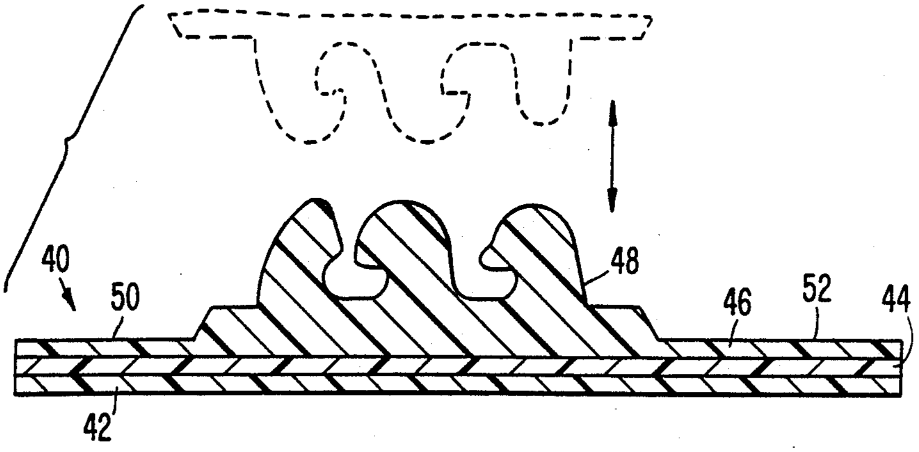
FIG. 7 is an enlarged, sectional view of another form of a sandwich strip according to the invention which may be used in a packing of the invention.

The strip material 40 of FIG. 7 for making a packing according to the invention comprises a base layer 42 formed of a first material well suited to be secured to a surface of a packing, such as a packing sheet. The first material of the base layer is preferably the same or similar to the material of the packing to which the strip material is to be secured. For example, the packing may be formed of a polyethylene film or sheet or of an ionomer sheet material such as Surlyn by Du Pont. The thickness of the base layer 42 of the strip material 40 is 30 microns in the illustrated embodiment, but this thickness could vary as will be readily understood by the skilled artisan. A film is generally understood to be a material having a thickness up to 250 microns, a sheet referring to a material with a thickness greater than 250 microns. However, as used herein, the expression "sheet material" is intended to refer in a general sense to a thin material in the form of either a film or a sheet.

An intermediate binding layer 44, having a thickness of 30 microns in the illustrated embodiment, securely connects the base layer 42 to the outer layer 46 of the strip material. The binding layer 44 is an adhesive layer formed, for example, of a drafted EMMA such as Bynel of Du Pont, or a drafted EVA such as Plexar from U.S.I. The binding layer 44, like the base layer 42 and outer layer 46, can be formed by extrusion and the three layers securely connected to one another by coextruding the layers through a common die to form the strip material 40 as illustrated in FIG. 7. The binding layer 44 joins the base layer 42 and the outer layer 46 with a binding effect which is stronger than the binding effect in a peel seal weld formed between the outer layer 46 and an opposed surface, such as the outer layer of another strip material.

The outer layer 46 is formed of a second material well suited for forming a peel seal weld with another surface. The outer layer 46 includes a longitudinally extending profiled portion 48 formed integrally therewith during extrusion of the outer layer 46 for forming a recloseable joint with a complementary profiled portion such as that showing in dashed lines in FIG. 7. The thickness of the outer layer 46 in the planar, outer portions thereof as shown in FIG. 7, is 30 microns with the profiled portion 48 projecting outwardly from the outer layer adjacent the laterally extending plane portions 50 and 52 a distance of 1–1.5 mm, for example. The outer layer can be formed of a peel seal mixture of, for example, 90% medium density polyethylene with 10% polybutylene. Another peel seal mixture which could be employed is 90% Surlyn and 10% Bynel. Alternatively, instead of using a peel seal mixture for the outer layer 46, the material could be one which forms a peel seal weld with a preselected, different material of the opposing surface of the packing, such as the outer layer of another strip material, to which it is to be peel seal welded. The bond strength of a peel seal weld according to the invention is less than the strength required to start elongation of the base sheet material and, preferably, is on the order of 1/5 or less the base sheet strength in tension. The peel seal weld should preferably maintain its original seal strength over an extended period of time, e.g., six months. The peel seal weld between a pair of opposed portions of strip material 40 can be made before joining the strip material to the packing material.

Figure 8:
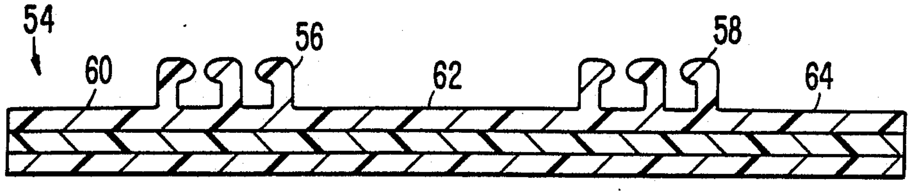
FIG. 8 is an enlarged, sectional view of an additional form of a sandwiched strip according to the invention which may be used in a packing of the invention.

The strip material 54 in FIG. 8 includes a pair of longitudinally extending profiled portions 56 and 58 located in spaced relation with plane portions 60, 62 and 64 extending laterally from the profiled portions. These plane portions are adapted to contact corresponding plane portions on a similar opposing strip material so that peel seal welds can be formed between the outer layers of the contacting strip materials at the facing plane portions 60, 62 and 64 while the profiled portions 56 and 58 are interengaged in locking relation with corresponding complementary profiled portions on the opposing strip material. Alternatively, it is possible to form a peel seal weld between the plane portions of the outer layer of the strip material and an opposed, contacting surface of a sheet material of a packing adjacent an opposed complementary profiled portion of the packing. In the case the strip material 54 is to be used on opposed portions of a packing, the opposed portions of the respective strip materials or strip material portions can be presealed to one another before joining the strip material to the packing.

Figure 9:
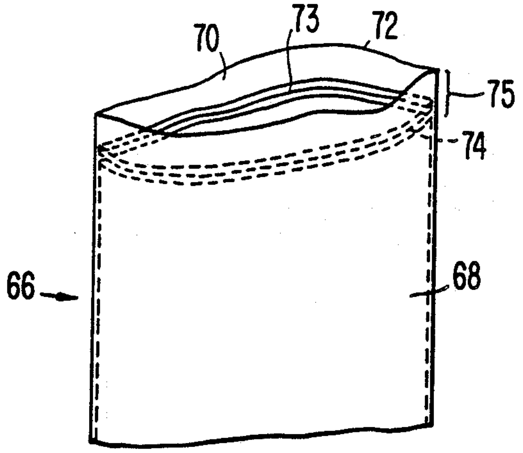
FIG. 9 is a perspective view of a bag formed according to the invention and illustrating the recessed position of the strip material in the opening of the bag.

The bag 66 in FIG. 9 has opposed sides 68 and 70 formed of a plastic sheet material, with an upper, mouth opening 72. Recessed within the mouth opening 72 are strip materials 73 and 74 which extend across the width of the mouth opening. The strip materials can be formed of the strip material 40 illustrated in FIG. 7, for example. The sides 68 and 70 of the bag are welded as by heat sealing to one another along the full length of the sides of the bag, including the portion 75 located above the strip materials 73 and 74 at the outer edge of opening 72. The materials of the sides 68 and 70 are not peel seal materials so that the bond strength of the welds at the sides of the bag is greater than a peel seal weld which is formed between opposed strip materials 73 and 74. This avoids the problem of tearing open the sides of the bag during opening of the mouth opening 72, which can occur where the sheet material of the packing is itself formed of a peel seal material as in conventional packings.

While I have shown and described only several embodiments in accordance with the present invention, it is understood that the same is not limited thereto, but is susceptible to numerous changes and modifications as known to those skilled in the art. For example, the packing of the invention can have a form other than a bag or a cup packing as disclosed herein. Both of the opposed surfaces of the packing need not be formed of sheet material, e.g., one could be a molded member having a film covering for closing it. Also, while the strip material of the invention has been shown as a composite of several layers, the strip material could be a monolayer, that is, formed of one layer, having a profiled portion formed integrally therewith on its outer surface, and being formed of a material well suited for forming a peel seal weld with an opposed surface of the packing and capable of forming a non-peel type of connection, having a strength higher than a peel seal weld, with the associated surface of the underlying packing material. As an example, the monolayer could be an extruded layer having the outer dimensions of the composite strip material in FIG. 7. The opposed surface of the packing to be peel seal welded to the monolayer could be formed of a peel seal mixture while the monolayer and its underlying packing material are formed of conventional materials capable of real sealing welding with each other. Therefore, I do not wish to be limited to the details shown and described herein, but intend to cover all such changes and modifications as are encompassed by the scope of the appended claims.

We claim:

1. A composite strip material for use in the production of a packing comprising a pair of opposed strip materials each comprising a base layer formed of a first material adapted to be secured to a packing sheet and an outer layer formed of a second material adapted to form a peel seal weld with another surface, the second material of at least one of said strip materials being a peel seal mixture, each of said strip materials having at least one longitudinally extending profiled portion formed integrally therewith for forming a recloseable interlocking joint with at least one complementary profiled portion, said base layer and said outer layer of each strip material being securely connected to one another by means of a non-peel seal type of connection, and wherein profiled portions of the pair of strip materials are peel seal welded to one another with a peel seal weld having a bond strength on the order of 1/5 or less the strength in tension of the base layers of the strips.

2. The composite strip material according to claim 1, wherein said base layer and said outer layer of each strip material are connected to one another via at least one intermediate layer.

3. The composite strip material according to claim 1, wherein said base layer and said outer layer of each strip material are connected to one another via an intermediate binding layer which binds the base layer and the outer layer together with a binding effect which is stronger than the binding effect on the peel seal weld formed between said outer layers.

4. The composite strip material according to claim 3, wherein said binding layer is an adhesive layer.

5. The composite strip material according to claim 1, wherein the several layers of each of said strip materials are coextruded.

6. The composite strip material according to claim 1, wherein said at least one longitudinally extending profiled portion of each strip material projects outwardly from its associated outer layer and said outer layer further includes at least one longitudinally extending plane portion projecting laterally from the at least one longitudinally extending profiled portion, the strip materials being peel seal welded to one another at opposed longitudinally extending plane portion thereof.

7. The composite strip material according to claim 1, wherein said second material of the outer layer of each strip is a peel seal mixture.

8. The composite strip material according to claim 1, wherein said first material of the base layer of each strip is the same or similar to the packing sheet to which the strip material is to be secured.

9. The composite strip material according to claim 1, wherein said outer layer of each strip is provided with a plurality of longitudinally extending profiled portions formed integrally therewith.

10. The composite strip material according to claim 9, wherein said plurality of profiled portions are spaced laterally from one another.

11. A composite strip material for use in the production of packings comprising a pair of opposed strip materials each comprising a base surface adapted to be securely connected to a packing material and an outer surface having at least one longitudinally extending profiled portion formed integrally therewith for forming a recloseable interlocking joint with the profiled portion of the other strip material and said outer surface of each strip material further comprising a longitudinally extending peel seal welding portion adapted to be peel seal welded to the peel seal welding portion of the other strip material, at least one of the peel seal welding portions of the pair of strip materials being a peel seal mixture, and wherein the profiled portions of the pair of opposed strip materials are engaged with one another and the peel seal welding portions of the strip materials are peel seal welded to one another.

12. The composite strip material according to claim 11, wherein the peel seal welding portions of the strip materials are located to one side of the engaged profiled portions.

13. A method of manufacturing a packing adapted to be closed by a peel seal weld joint at an opening thereof and also adapted to be closed and recloseable by means of profile portions extending over opposed surfaces of the packing in a closure area thereof, comprising the steps of providing a composite strip material including a pair of opposed strip materials each comprising a base layer formed of a first material adapted to be secured to a surface of the packing and an outer layer formed of a second material adapted to form a peel seal weld with another surface, the second material of at least one of said strip materials being a peel seal mixture, each of said strip materials having at least one longitudinally extending profiled portion formed integrally therewith for forming a recloseable interlocking joint with the at least one longitudinally extending profiled portion on the opposing strip material, and said base layer and said outer layer of each strip material being securely connected to one another by means of a non-peel seal type of connection, and wherein profiled portions of the strip materials are engaged with one another and the outer layers of the strip materials are peel seal welded to one another with a peel seal weld having a bond strength on the order of 1/5 or less the strength in tension of the base layers of the strips, and securing said composite strip material to respective surfaces of packing material by connecting said base layer of each of said strip materials to a packing material surface.

14. The method according to claim 13, wherein said step of securing the base layers of said strip materials to the packing material surfaces involves welding the base layers to the packing material surfaces.

15. The method according to claim 13, wherein said packing material is a sheet material.

16. The method according to claim 13, wherein said packing is a bag.

17. The method according to claim 13, wherein said step of providing a composite strip material includes connecting the several layers of each of said pair of strip materials by coextrusion before connecting said base layers of the strip materials to said respective packing material surfaces.

18. A method of manufacturing a packing adapted to be closed by a peel seal weld joint at an opening thereof and also adapted to be closed and recloseable by means of profiled portions extending over opposed surfaces of the packing in a closure are thereof, comprising the steps of providing a composite strip material including a pair of opposed strip materials each comprising a base surface adapted to be securely connected to a packing material, and an outer surface having at least one longitudinally extending profiled portion formed integrally therewith for forming a recloseable interlocking joint with the profiled portion of the other strip material and said outer surface of each strip material further comprising a longitudinally extending peel seal welding portion adapted to be peel seal welded to the peel seal welding portion of the other strip material, at least one of the peel seal welding portions of the pair of strip materials being a peel seal mixture, and wherein the profiled portions of the pair of opposed strip materials are engaged with one another, and securing said composite strip material to respective surfaces of packing material by connecting the base surfaces of the pair of strip materials to the respective surfaces of packing material.

19. The method according to claim 18, wherein said step of providing the composite strip includes the step of peel seal welding opposed peel seal welding portions of the pair of strip materials to one another before said securing step.

* * * * *